United States Patent
Cagne et al.

(10) Patent No.: US 11,994,289 B2
(45) Date of Patent: May 28, 2024

(54) METHOD FOR DETERMINING THE FLOW RATE OF COMBUSTIBLE FLUID INJECTED INTO A COMBUSTION CHAMBER WITHOUT AN ADDITIONAL ORIFICE PLATE

(71) Applicant: GE ENERGY PRODUCTS FRANCE SNC, Belfort (FR)

(72) Inventors: Sébastien Cagne, Belfort (FR); Christian-Anghel Solacolu, Belfort (FR)

(73) Assignee: GE ENERGY PRODUCTS FRANCE SNC, Belfort (FR)

( * ) Notice: Subject to any disclaimer, the term of this patent is extended or adjusted under 35 U.S.C. 154(b) by 555 days.

(21) Appl. No.: 17/278,382

(22) PCT Filed: Sep. 16, 2019

(86) PCT No.: PCT/FR2019/052146
§ 371 (c)(1),
(2) Date: Mar. 22, 2021

(87) PCT Pub. No.: WO2020/058617
PCT Pub. Date: Mar. 26, 2020

(65) Prior Publication Data
US 2021/0348759 A1 Nov. 11, 2021

(30) Foreign Application Priority Data

Sep. 21, 2018 (FR) ...................................... 18 58607
Dec. 20, 2018 (FR) ...................................... 18 73577

(51) Int. Cl.
*F23N 5/18* (2006.01)
*F23R 3/28* (2006.01)
(Continued)

(52) U.S. Cl.
CPC .................. *F23N 5/18* (2013.01); *F23R 3/28* (2013.01); *G01F 1/42* (2013.01);
(Continued)

(58) Field of Classification Search
CPC ..... G01F 1/42; G01F 1/40; G01F 1/36; F23N 2225/06
See application file for complete search history.

(56) References Cited

U.S. PATENT DOCUMENTS

2009/0071119 A1* 3/2009 Kervistin ................ F02C 7/232
60/779
2013/0312421 A1* 11/2013 Palczewski ............... G01F 1/42
73/195

OTHER PUBLICATIONS

International Search Report dated Nov. 11, 2019.

* cited by examiner

*Primary Examiner* — Ko-Wei Lin
(74) *Attorney, Agent, or Firm* — IPSILON USA, LLP

(57) ABSTRACT

A method for determining the flow rate of combustible fluid injected into a combustion chamber (120) of a turbine (100) includes determining the cross section of the orifice of the at least one injector (112, 113, 114, 115) through which the combustible fluid is injected into the combustion chamber (120). The pressure of the combustible fluid upstream of the orifice of the injector (112, 113, 114, 115) is determined. The pressure downstream of the orifice of the injector (112, 113, 114, 115) is determined. The flow rate of combustible fluid flowing through the orifice of the at least one injector (112, 113, 114, 115) is determined.

8 Claims, 2 Drawing Sheets

(51) Int. Cl.
*G01F 1/42* (2006.01)
*G01F 15/00* (2006.01)
(52) U.S. Cl.
CPC .... *F23N 2005/185* (2013.01); *F23N 2241/20* (2020.01); *G01F 15/002* (2013.01)

METHOD FOR DETERMINING THE FLOW RATE OF COMBUSTIBLE FLUID INJECTED INTO A COMBUSTION CHAMBER WITHOUT AN ADDITIONAL ORIFICE PLATE

RELATED APPLICATION

This application is a National Phase of PCT/FR2019/052146 filed on Sep. 16, 2019 which claims the benefit of priority from French Patent Application Nos. 18 58607, filed on Sep. 21, 2018 and 18 73577 filed on Dec. 20, 2018, the entirety of which are incorporated by reference.

FIELD OF THE INVENTION

The present invention relates to a method for determining the flow rate of combustible fluid injected into a turbine having one or more turbine combustion chambers, notably a gas turbine. The invention also relates to a method for triggering such a method for determining.

DESCRIPTION OF RELATED ART

A gas turbine generally comprises an intake section, a compressor, one or more combustion chambers, a turbine, and an exhaust section. Each combustion chamber may comprise one or more injectors of combustible fluid.

A flow path may be defined through the gas turbine. In normal operation, air enters the gas turbine through the intake section. The air flows into the compressor, where its pressure is increased. The compressed air then circulates through towards all of the combustion chambers, where it mixes with the fuel such as gas to form a combustible air-fuel mixture. The air-fuel mixture is injected into the combustion chamber in order to be burnt. This combustion generates hot gases which are injected into the turbine in order to extract the energy contained in the hot gases. Thereafter, the exhaust can be discharged from the gas turbine through the exhaust section.

The regulation and protection system for high-power gas turbines generally includes protection or limitation on start-up and before combustion or flame is detected. This protection consists in limiting the quantity of unburnt combustible gas, during ignition in the combustion chamber, before the flame is detected, that enters the turbine and the recuperation boiler which is situated downstream.

In general, it is necessary to measure the flow rate of the combustible fluid in order to regulate the turbine during normal operation and also before the flame is detected. Most of the flow rate measuring systems installed are suited to measuring at nominal load, namely after ignition and after the alternator has been synchronized to the network.

However, the gas flow rate prior to ignition is considerably lower in comparison with the flow rate at nominal load, and so a flow meter for nominal load will have too great a relative margin of error to be able to provide an adequate estimation of a low flow rate like the one needed for ignition. In addition, installing a second flow meter in order to measure the ignition flow rate would impose an additional and undesirable pressure drop on the combustible gas in the combustible-fluid system.

It is known practice, notably from document WO 99067617, to use a flow rate measuring device that operates on the principle whereby a fluid flowing through a restriction orifice will experience a pressure drop in an amount proportional to the square of the flow rate. If the characteristics of the fluid and of the orifice are perfectly known, then the pressure drop measured across the orifice will allow the fluid flow rate to be deduced. This then is the measuring of a flow rate using an orifice plate. This measurement allows the instantaneous volumetric flow rate to be deduced directly. This pressure drop located at the orifice plate (or restriction orifice) is not a loss of energy (pressure drop) but rather a conversion of "pressure" energy into "velocity" energy.

The measurement method entails the use of an additional orifice plate or restriction orifice placed in the passage of the combustible fluid injected. This leads to an additional drop in pressure in the combustible fluid circuit. In addition, this method is expensive because it requires an additional member devoted to this flow rate measurement.

There is therefore still a need for a solution for determining the flow rate of combustible fluid injected into the combustion chamber that does not exhibit the aforementioned disadvantages. In particular, there is still a need for a solution for determining the flow rate of combustible fluid injected into the combustion chamber that is less expensive and that is easier to integrate into the combustion chamber and to implement.

Document US20070186557 A1 defines the effective cross sectional area (Ae) as being a physical correction dependent on the pressure, on the velocity and on the temperature upstream and downstream of the injectors. In particular, the sizing of the effective cross sectional area makes it possible to define the pressure at the inlet to the injector. The sizing of this effective cross sectional area makes it possible to ensure that the pressure ratios in the injectors do not exceed the maximum or minimum permissible limits, known as the critical pressure ratio CPR (1.78) beyond which the flow rate remains constant.

OBJECTS AND SUMMARY

In order to do that, the invention proposes a method for determining the flow rate of combustible fluid injected into a combustion chamber of a turbine, the combustible fluid being injected into the combustion chamber through an orifice of at least one injector, the method comprising the following steps:
  determining the cross section of the orifice of said at least one injector through which the combustible fluid is injected into the combustion chamber,
  determining the pressure of the combustible fluid upstream of the orifice of the injector,
  determining the pressure downstream of the orifice of the injector,
  determining the flow rate of combustible fluid flowing through the orifice of said at least one injector as a function of the determined cross section of the orifice of said at least one injector, of the determined pressure of the combustible fluid upstream of the orifice of the injector, and of the determined pressure downstream of the orifice of the injector,
  determining the flow rate of combustible fluid injected into the combustion chamber as a function of the pressure difference across said at least one injector.

According to one embodiment of the method for determining, the flow rate of combustible fluid injected into the combustion chamber is determined as being the sum of the flow rates of combustible fluid flowing through the plurality of injectors.

According to one embodiment of the method for determining, the pressure of the combustible fluid downstream of the orifice of the injector is the pressure inside the combustion chamber.

According to one embodiment of the method for determining, the combustible fluid is a gas mixture.

According to one embodiment of the method for determining, the pressure of the combustible fluid upstream of the orifice of the injector is determined indirectly by measuring the difference in pressure between the fuel line and the pressure of the compressed air leaving the compressor.

According to one embodiment of the method for determining, the determining of the flow rate of combustible fluid injected into the combustion chamber is performed before the ignition in the combustion chamber.

According to one embodiment of the method for determining, the determining of the flow rate of combustible fluid is performed when the pressure upstream of a space into which said at least one injector opens is strictly higher than the pressure in said space.

According to one embodiment of the method for determining, the turbine comprises a plurality of combustion chambers each comprising at least one injector of combustible fluid, the determining of the flow rate of combustible fluid injected into each of the combustion chambers being performed up until the point of ignition in all the combustion chambers.

According to one embodiment of the method for determining, the turbine comprises at least one combustible-fluid supply circuit supplying combustible fluid to said at least one combustion chamber, said at least one combustible-fluid supply circuit being connected to at least one distribution device providing a supply to said at least one injector, wherein the determining of the flow rate of combustible fluid injected into the combustion chamber is performed as a function of the pressure measured at a single distribution device.

The invention also relates to a method for triggering the determining of a flow rate of combustible fluid injected into a combustion chamber, the combustible fluid being injected into the combustion chamber through an orifice of at least one injector, the method comprising the following steps:
  determining the difference between the pressure of the combustible fluid upstream of the orifice of the injector and the pressure of the combustible fluid downstream of the orifice of the injector,
  if the pressure of the combustible fluid upstream of the orifice of the injector is higher than the pressure downstream of the orifice of the injector, implementing the method for determining as described hereinabove.

BRIEF DESCRIPTION OF THE DRAWINGS

The attached drawings illustrate the invention.

DESCRIPTION OF EMBODIMENT(S)

Figure 1:
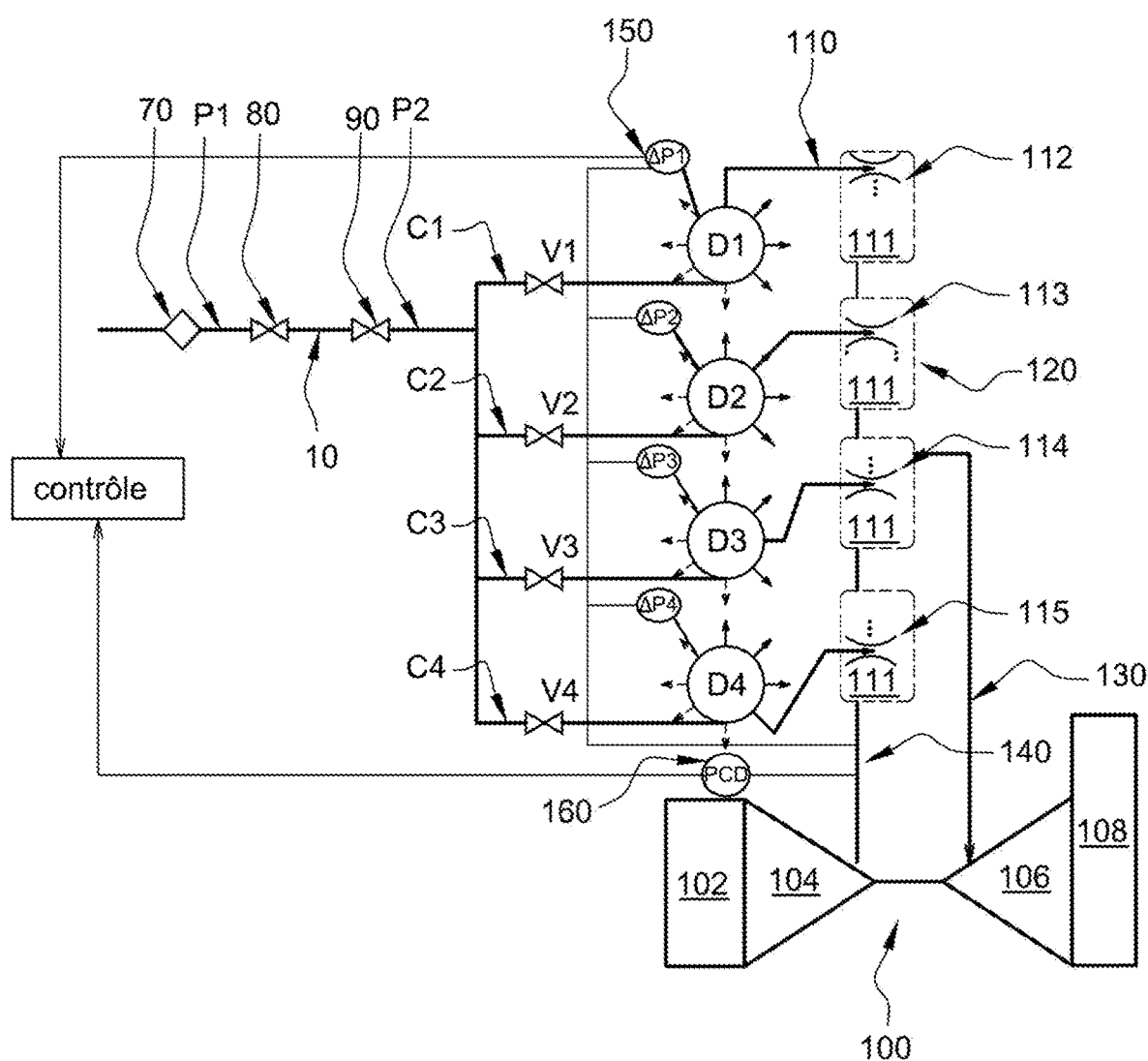
FIG. 1 schematically depicts a partial sectional view of a gas turbine.

With reference to FIG. 1, the auxiliary combustible-fluid supply system 10 for a gas turbine 100 is connected to a combustible-fluid source at a pressure P1. The auxiliary system 10 may comprise a filter 70, a shuttle valve 80 and a pressure regulating valve 90, downstream of which a pressure P2 is maintained.

As indicated hereinabove, the gas turbine 100 comprises an intake section 102, a compressor 104, one or more combustion chambers 120, a turbine 106 and an exhaust section 108. Each combustion chamber 120 may comprise one or more types of injector 112, 113, 114, 115.

A flow path may be defined through the gas turbine 100. In normal operation, air enters the gas turbine 100 through the intake section 102. The air flows into the compressor 104, which compresses the air to form compressed air. The compressed air enters the entire combustion chamber via 140, to mix with the fuel such as gas, to form a combustible air-fuel mixture in the space 111. One or more of the injectors 112, 113, 114, 115 open into this space 111.

The air-fuel mixture burnt in the combustion chamber 120 generates a flow of hot gases passing along a duct 130 towards the turbine section 106 where the kinetic energy of the hot gases is converted into mechanical energy, before being discharged via the exhaust section 108.

The level of compression needed before entering the combustion chamber is generally expressed in terms of a pressure ratio in relation to the compressor delivery pressure (PCD) measured by the pressure sensor 160. This pressure ratio is generally comprised between 1.1*PCD and 1.5*PCD. For that, a pressure sensor 150 is used to constantly monitor the difference in pressure between the combustible-fluid line and the pressure PCD at the outlet of the compressor 104.

Figure 2:
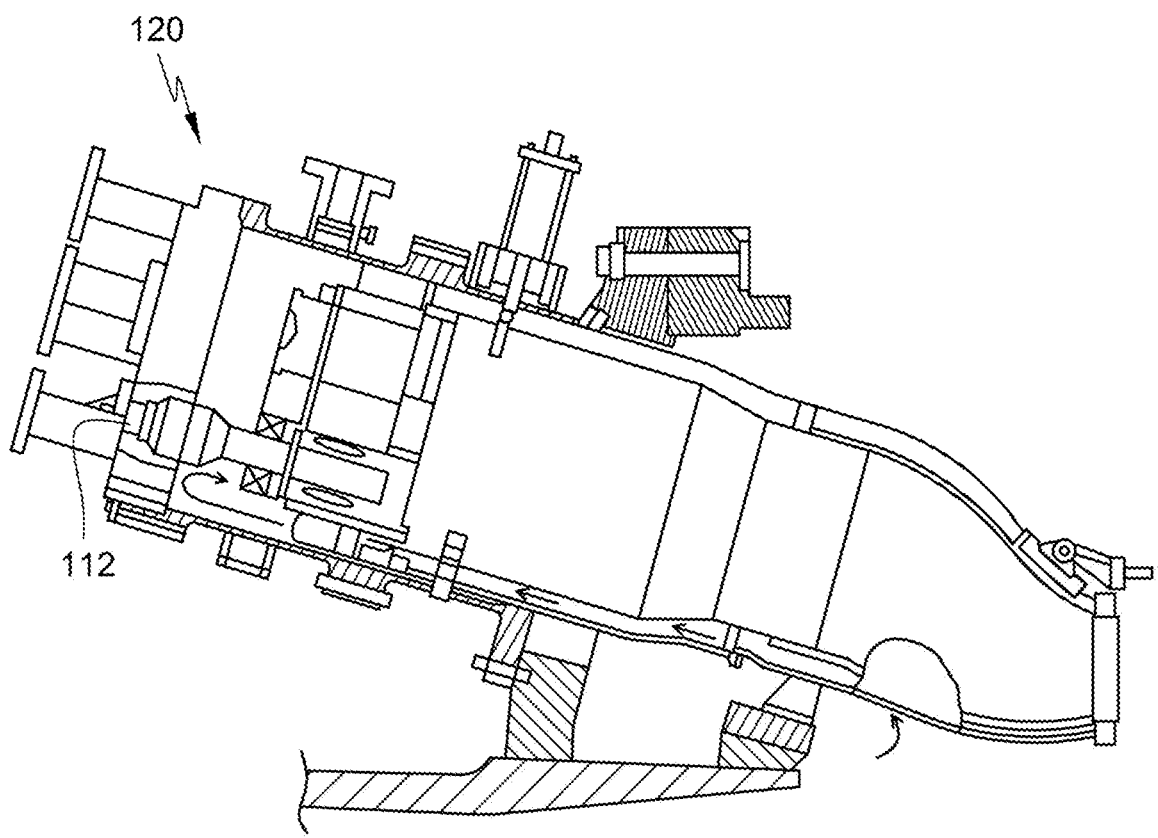
FIG. 2 depicts an operation diagram for the gas turbine of FIG. 1.

The combustion systems may comprise at least one combustion chamber 120 with at least one type of injector each with a specific flow rate. The homogeneous distribution of combustible fluid in each type of injector is preferably obtained via a dedicated distribution circuit. FIG. 1 depicts a combustible-fluid distribution system for at least one combustion chamber 120, each chamber being equipped with at least one type of injector, for example four, but just one of each type 112, 113, 114, 115 has been depicted per chamber. Each type of injector is supplied by four combustible-fluid supply circuits C1, C2, C3, C4 each one connected to a distribution device D1, D2, D3, D4 providing a supply to the injectors 112, 113, 114, 115 respectively. Each distribution circuit may have particular characteristics in terms of flow rate. In addition, the injectors 112, 113, 114, 115 may be arranged in the one same combustion chamber 120, for example in a circular configuration around a longitudinal axis of the combustion chamber 120, as depicted in FIG. 2. In this way, the total number of injectors in the combustion system is the number of injector types per chamber times the number of chambers. The total flow rate involved in combustion can thus be deduced in a simplified way by estimating the flow rate through at least one injector of each type 112, 113, 114, 115 and then by multiplying that by the number of combustion chambers 120. Of course a single measurement on a distribution device is possible in the case of a partial flow rate measurement, or for the purpose of testing the combustion system.

The method is described hereinafter in connection with a turbine such as the gas turbine 100 depicted in FIGS. 1 and 2. Alternatively, the method for determining can be implemented in any turbine comprising at least one combustion chamber equipped with at least one injector for injecting a combustible fluid into the combustion chamber and when, in normal operation, the pressure upstream of the network of injectors of each combustion chamber may exceed a pressure downstream.

The method uses the principle of measuring flow rate through an orifice, and to do so it considers the characteristics of at least each type of injector 112, 113, 114, 115 used in the combustion chambers 120 such as the effective cross sectional areas (Ae) and the pressures upstream and downstream of each injector.

Thus, the pressure downstream and upstream, and the ratio of these pressures, enable an estimation of a mass flow rate through each type of injector then the determination of the total flow rate of combustible fluid injected into all of the combustion chambers 120. In other words, the flow rate of combustible fluid injected into the combustion chambers 120 is determined as being the sum of the estimated flow rates of combustible fluid flowing through each type of injector 112, 113, 114, 115 and multiplied by the number of chambers 120.

The method considers the use of the effective cross sectional area of at least each type of injector 112, 113, 114, 115 in the combustion chamber 120. Each injector is characterized as having an effective cross sectional area for the passage of the combustible fluid between the cover at 110 and after the injector at 111 the dimensions of which are known according to the operating mode. The effective passage cross sectional area can be likened to an orifice. Thus, the pressure at the cover at 110 can be calculated for each of the design points on the basis of: the mass flow rates, the pressure inside the combustion chamber at 111 and the properties of the combustible gas.

In addition, an equation relating the mass flow rate of a circuit, the pressure ratio of the injector, the properties of the fuel, the pressure in the combustion chamber (PCC) and the effective cross sectional area is known to those skilled in the art.

Thus, if the effective cross sectional area of each type of injector 112, 113, 114, 115 and the pressure upstream at 110 and downstream at 111 are known, then the mass flow rate for each type of injector can be calculated.

For the purposes of the present description, the term "pressure upstream" or "upstream pressure" is defined as being a static pressure of the combustible fluid at a point 110 situated upstream or at the inlet of any one of the injectors 112, 113, 114, 115. In order to estimate the combustible-gas pressure (Pc) upstream of the injectors at 110 it is possible to use the air delivery pressure of the compressor, or PCD, measured at 160, and a measurement 150 of the differential pressure between the combustible-fluid line and the compressor delivery pressure PCD, and for that, use may be made of the following formula:

$$Pc = PCD + \Delta P(\text{combustible-fluid line and } PCD)$$

The pressure downstream of the injectors or inside the combustion chamber at 111 is the pressure of the air/gas mixture in the chamber. This pressure cannot be measured directly, but it is possible to measure a relatively similar pressure which is the PCD 160. Specifically, the pressure in the combustion chamber (Pcc) is equivalent to the compressor discharge pressure (CPD) minus the pressure drop experienced by the compressed air leaving the compressor through the combustion chamber (which pressure drop is known or estimated as a percentage).

Thus, if the effective cross sectional areas of the injector and the pressures upstream at 110 and downstream at 111 are known, then the mass flow rate per injector type 112, 113, 114, 115 can also be calculated.

As a result, the flow rate of combustible fluid injected into the combustion chamber can be determined as a function of the flow rate of combustible fluid flowing through the orifice of said at least one injector. This orifice is positioned inside the combustion chamber as depicted in FIG. 1. Each orifice of the plurality of injectors 112, 113, 114, 115 is arranged inside the corresponding combustion chamber. This determination therefore does not require the addition of an additional restriction orifice or orifice plate in order to measure the flow rate. The method for determining is thus simplified and less expensive. In addition, the absence of an additional orifice plate or restriction orifice makes it possible to avoid creating an additional pressure drop in the combustible-fluid circuit.

As a preference, the determining of the flow rate of combustible fluid injected into the combustion chamber 120 is performed when the pressure of the combustible fluid P2 upstream of the orifice of the injector 112, 113, 114, 115 is higher than the pressure downstream as far as the space 111 and before ignition in the combustion chamber. Specifically, this determining makes it possible to determine the quantity of unburnt combustible gas injected during ignition in the combustion chamber 120, before the flame is detected, which enters the turbine 100 and the recuperation boiler situated downstream. This allows the gas turbine to be regulated and therefore protected.

In order to allow improved protection, the determining of the flow rate of combustible fluid injected into each of the combustion chambers 120 is performed up until the point of ignition in all the combustion chambers.

The method corresponds to a method for indirectly measuring the flow rate of the combustible fluid, which method is suited to measuring a flow rate before ignition. The method is particularly simple to implement because it does not use an additional orifice plate to estimate the flow rate and does not produce an additional pressure drop. In addition, measuring the flow rate as close as possible to the injection into the combustion chamber makes it possible to have the most correct possible value (discounting measurement errors) unlike measurements from a flow meter which are often taken upstream on the combustible-fluid supply line. Specifically, there may be numerous leaks in the supply line between this flow meter and the combustion chambers, as is the case with gas ports, which may falsify the measurement. Thus, a flow meter measurement upstream in the line, via a port that is excessively leaky, would lead to a loss of operability of the machine.

The invention claimed is:

1. A method for determining a flow rate of combustible fluid injected into a combustion chamber of a turbine, the combustible fluid being a gas mixture and injected into the combustion chamber through an orifice of at least one injector, said orifice being arranged inside the combustion chamber, the method comprising the following steps:
   injecting the combustible fluid into the combustion chamber through the orifice of the at least one injector,
   determining a cross section of the orifice of said at least one injector through which the combustible fluid is injected into the combustion chamber,
   determining a pressure of the combustible fluid upstream of the orifice of the at least one injector,
   determining a pressure downstream of the orifice of the at least one injector,
   determining the flow rate of combustible fluid flowing through the orifice of said at least one injector as a function of the determined cross section of the orifice of said at least one injector, of the determined pressure of the combustible fluid upstream of the orifice of the at least one injector, and of the determined pressure downstream of the orifice of the at least one injector,
   determining the flow rate of combustible fluid injected into the combustion chamber as a function of the pressure difference between the pressure of the combustible fluid upstream of the orifice and the pressure of the combustible fluid downstream of the orifice, across said at least one injector, wherein the pressure of the combustible fluid upstream of the orifice of the at least one injector is determined indirectly by measuring the difference in pressure between a combustible-fluid line and the pressure of the compressed air leaving a compressor.

2. The method for determining according to claim 1, where the combustion chamber further comprises a plurality of injectors, wherein the flow rate of combustible fluid injected into the combustion chamber is determined as being the sum of the flow rates of combustible fluid flowing through the plurality of injectors.

3. The method for determining according to claim 1, wherein the pressure of the combustible fluid downstream of the orifice of the injector is the pressure inside the combustion chamber.

4. The method for determining according to claim 1, wherein the determining of the flow rate of combustible fluid injected into the combustion chamber is performed before the ignition in the combustion chamber.

5. The method for determining according to claim 1, wherein the determining of the flow rate of combustible fluid is performed when the pressure upstream of a space into which said at least one injector opens is strictly higher than the pressure in said space.

6. The method for determining according to claim 1, wherein the turbine further comprises a plurality of combustion chambers each comprising at least one injector of combustible fluid, the determining of the flow rate of combustible fluid injected into each of the plurality of combustion chambers being performed up until the point of ignition in all the combustion chambers.

7. The method for determining according to claim 1, the turbine comprising at least one combustible-fluid supply circuit supplying combustible fluid to said combustion chamber, said at least one combustible-fluid supply circuit being connected to one or more distribution devices providing a supply to said at least one injector, wherein the determining of the flow rate of combustible fluid injected into the combustion chamber is performed as a function of the pressure measured at a single one of said one or more distribution devices.

8. A method for triggering the determining of the flow rate of combustible fluid injected into a combustion chamber, wherein if the pressure of the combustible fluid upstream of the orifice of the injector is higher than the pressure downstream of the orifice of the injector, then implementing the method for determining according to claim 1.

* * * * *